(No Model.)
O. S. HAMMOND.
PNEUMATIC TIRE.
No. 591,551. Patented Oct. 12, 1897.
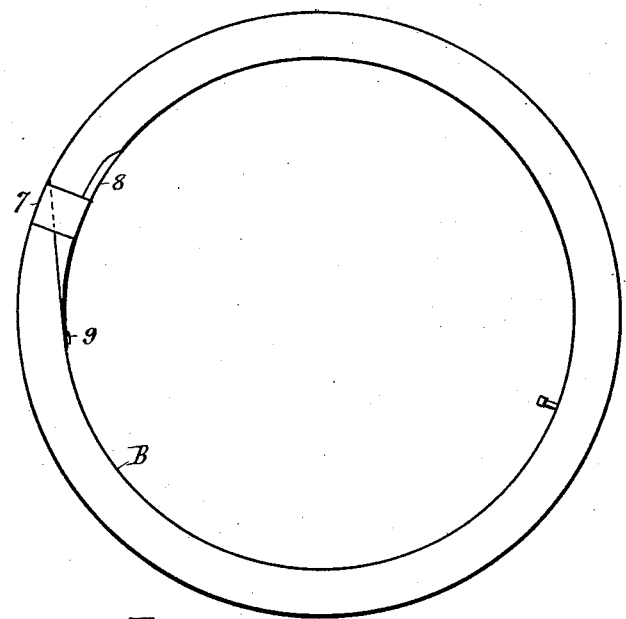
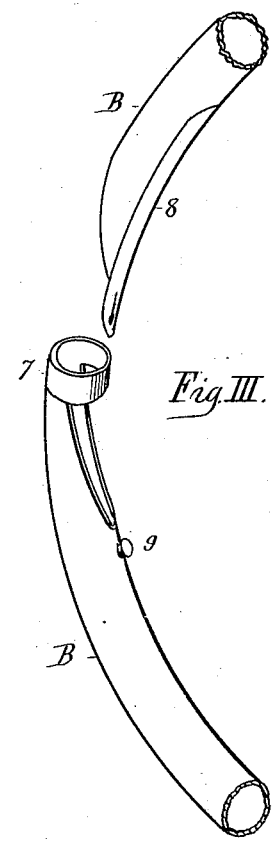
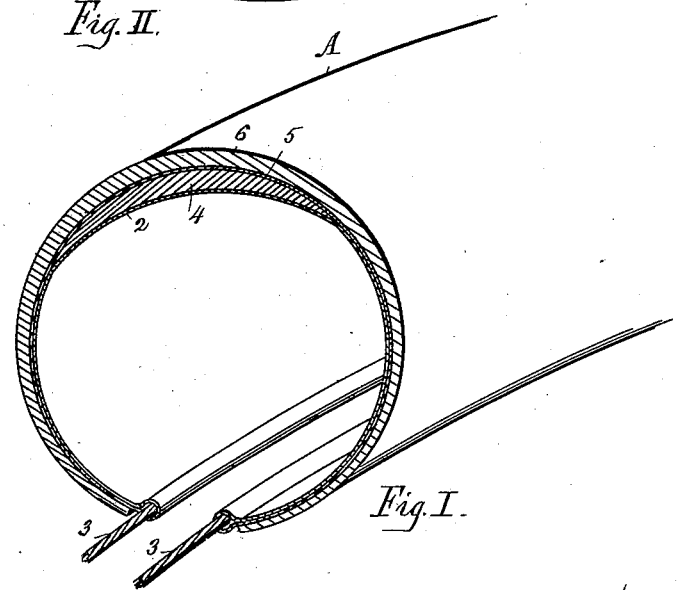
Witnesses
R. S. Millar.
L. M. Adams
Inventor
O. S. Hammond.
By J. Bailey Atty

UNITED STATES PATENT OFFICE.

OLIVER S. HAMMOND, OF TORONTO, CANADA.

PNEUMATIC TIRE.

SPECIFICATION forming part of Letters Patent No. 591,551, dated October 12, 1897.

Application filed February 1, 1897. Serial No. 621,458. (No model.)

*To all whom it may concern:*

Be it known that I, OLIVER S. HAMMOND, a subject of the Queen of Great Britain, residing at Toronto, in the county of York, Province of Ontario, and Dominion of Canada, have invented a new and useful Improvement in Pneumatic Wheel-Tires, which improvement is fully set forth in the following specification and accompanying drawings, in which—

Figure 1 is a perspective cross-section showing the construction of my improved pneumatic wheel-tire. Fig. 2 is a view of the inflatable tube, showing the manner of attaching the ends thereof; and Fig. 3, the same in detached position.

My invention pertains to certain improvements in pneumatic wheel-tires; and my purpose is to provide a novel, practical, and efficient device designed, primarily, to obviate the liability to puncture, and, secondly, to provide means whereby the tire and its adjuncts may be easily detached for repairs in the event of injuries produced by extraordinary causes.

The peculiar construction and exceptional advantages of the invention will be apparent by referring to the accompanying illustrations, in which A indicates the elastic outer tire, and B the inflatable tube. The former is composed of an interior layer of canvas or other suitable fabric 2, the fibers thereof being bias or diagonally disposed in order to resist any tendency to tear or stretch. The borders of the canvas are folded over wire cables 3 and secured by suitable cement. The cables are made of brass instead of iron or steel, which, being liable to corrode, would injure and eventually destroy the canvas. A strip of puncture-proof leather 4, crescent-shaped in cross-section, is placed upon the canvas 2 and overlaid by a strip of straight-fibered canvas 5, the borders of which extend downwardly to the cables and are cemented to the inner canvas 2. The leather strip is sufficiently wide to guard the inner parts of the tire against injury from ordinary causes, but not so wide as to interfere with the elasticity of the outer rubber fabric 6, which is reinforced on its treading-surface and extends downwardly to the cables on each side, overlapping the canvas strip 5, to which it is securely attached by cement.

It will be observed that if a tack or a pointed fragment of glass should penetrate the rubber and the adjoining canvas strip the nature of the fabric is such that a large number of threads must be severed before it gives way, and if by reason of an extraordinary puncture it should do so the inner bias strip of canvas will hold the tire together.

The inflatable tube B is formed with tapering ends, as shown in the drawings. A rubber collar 7 is suitably attached to one end, the other having a strip or tongue of canvas 8 attached thereto by cement. The ends of the tube are joined by drawing the tongue through the collar and fastening it to a hook or button 9.

It will be seen that in the event of possible damage to the tube it may be detached, repaired, and replaced without difficulty or delay.

What I claim as new is—

The combination with the pneumatic tire B, having an elastic collar 7 at one end and cut away in rear thereof, the button 9 secured to said tube, and the tongue 8 secured to the tube and passing through the said collar and engaging with the button 9, of the elastic tire A having the edges turned inwardly, the wires to which said turned-in edges are secured, the layer 5, of textile material, and the crescent-shaped strip 4 of leather and the lining 2 of textile material, substantially as described.

In testimony that I claim the foregoing I have hereunto set my hand, this 6th day of January, 1897, in the presence of witnesses.

OLIVER S. HAMMOND.

Witnesses:
GEO. WORTHINGTON,
A. HAMMOND.